(12) United States Patent
Vollhardt

(10) Patent No.: US 6,850,146 B2
(45) Date of Patent: Feb. 1, 2005

(54) DEVICE FOR CONTROLLING A SECURITY DEVICE

(75) Inventor: Michael Vollhardt, Königstein (DE)

(73) Assignee: Siemens Aktiengesellschaft, Munich (DE)

(*) Notice: Subject to any disclaimer, the term of this patent is extended or adjusted under 35 U.S.C. 154(b) by 240 days.

(21) Appl. No.: 10/112,034

(22) Filed: Apr. 1, 2002

(65) Prior Publication Data

US 2002/0158748 A1 Oct. 31, 2002

(30) Foreign Application Priority Data

Mar. 30, 2001 (DE) .......................................... 101 16 221
Aug. 3, 2001 (DE) .......................................... 101 37 485

(51) Int. Cl.$^7$ .............................. H04B 1/00; H04B 1/38
(52) U.S. Cl. .................... 340/5.28; 340/5.26; 340/5.63; 340/5.64; 340/5.72
(58) Field of Search .............................. 340/5.28, 5.26, 340/5.63, 5.72, 5.64

(56) References Cited

U.S. PATENT DOCUMENTS 4,688,036 A * 8/1987 Hirano et al. .............. 340/5.72
5,442,348 A * 8/1995 Mushell ...................... 340/5.73
5,600,324 A * 2/1997 Reed et al. ................. 340/5.26
5,978,483 A * 11/1999 Thompson et al. ........ 340/5.26

FOREIGN PATENT DOCUMENTS

DE 44 30 315 C2 2/1996
EP 311112 A2 * 4/1989 ........... E05B/49/00

OTHER PUBLICATIONS

Search Report of the French Patent and Trademark Office dated Jul. 22, 2004.

* cited by examiner

Primary Examiner—Brian Zimmerman
Assistant Examiner—Clara Yang
(74) Attorney, Agent, or Firm—Morrison & Foerster LLP

(57) ABSTRACT

A device for controlling a security device, preferably for securing a motor vehicle against unauthorized use, a portable key having a transmitter for sending messages after every actuation and the security device comprising a receiver for messages and the messages including alternating code values which change from message to message. A lag time of equal duration is implemented in the transmitter and receiver respectively, such that the transmitter is switched off by the duration of the lag time. When the transmitter which is not switched off is actuated, a message is transmitted, and when the switched-off transmitter is actuated the transmitter is switched on. The security device is controlled if the time difference information included in the message corresponds to the time difference information which is correspondingly determined in the receiver.

2 Claims, 3 Drawing Sheets

DEVICE FOR CONTROLLING A SECURITY DEVICE

CLAIM FOR PRIORITY

This application claims priority to Application Nos. 10116221.9 and 10137485.2 which were filed in the German language on Mar. 30, 2001, and Aug. 3, 2001, respectively.

TECHNICAL FIELD OF THE INVENTION

The invention relates to a device for controlling a security device, and in particular, to a device for securing a motor vehicle against unauthorized use.

BACKGROUND OF THE INVENTION

Devices of the genus-forming type are applied as central locking systems in motor vehicles. An example is described in DE 44 30 315 C2 as the prior art. Despite the alternating code values, misuse is possible. Such misuse can, for example, be carried out when there is an authorized attempt to unlock the central locking system. In this case, the message which is emitted is received by a person attempting illegal intervention and recorded. The reception of the message at the same time is disrupted by a radio frequency signal which lies within the reception bandwidth of the central locking receiver, but not in the reception bandwidth of the receiver of the person attempting illegitimate intervention. In this way, the person attempting illegal intervention can record a message and transmit it again which is detected as valid in the receiver.

In order to avoid such illegal interventions, a transmitter and receiver with a clock may be provided to compare the transmission time of the respective message with its reception time, as disclosed for example in DE 44 30 315 C2. A transmission with divergent timing, and thus an illegal intervention or an unauthorized attempt at unlocking can thus be detected in the receiver. However, this device has the disadvantage that a battery provided in the transmitter is additionally discharged by the clock, which is disadvantageous in particular when the transmitters are miniaturized—for example when embodied as a chip card.

SUMMARY OF THE INVENTION

The present invention specifies a device for controlling the security device which prevents misuse of a monitored message without a clock having to be operated continuously in the transmitter.

In one embodiment of the invention, a lag time of equal duration is implemented in the transmitter and receiver respectively. The transmitter is switched off by the duration of the lag time after a respective last actuation, such that when the transmitter which is not switched off is actuated a message is transmitted which includes information (time difference information) indicating how much time has passed since the preceding message was transmitted. When the switched-off transmitter is actuated the transmitter is switched on and transmits a message which includes, as time difference information, information indicating that the lag time has expired, and that the security device is controlled if the time difference information included in the message corresponds to the time difference information which is correspondingly determined in the receiver.

The invention has the advantage that the battery of the transmitter is not continuously loaded. The invention is characterized by a lower degree of expenditure even in comparison with the use of a power-saving clock chip in the transmitter.

When the time difference information is compared, tolerances are taken into account in the determination of the time in the transmitter and the receiver.

In the device according to the invention one embodiment provides for the messages to include the alternating code values and the time difference information in encrypted form.

BRIEF DESCRIPTION OF THE DRAWINGS

The invention permits numerous embodiments. One of these is illustrated schematically in the drawing by reference to a plurality of figures and described below. In the drawings.

DETAILED DESCRIPTION OF THE PREFERRED EMBODIMENTS

Figure 1:
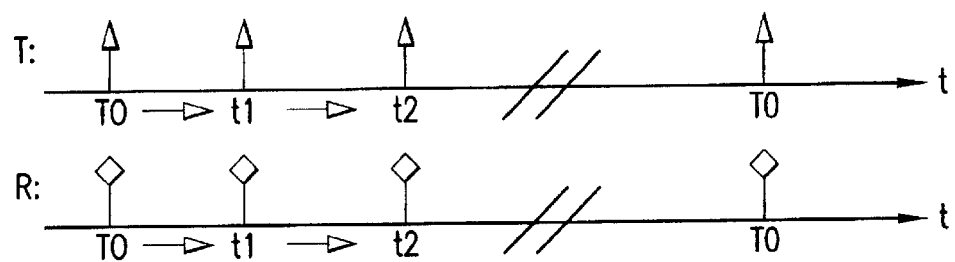
FIG. 1 shows the emission and the reception of a plurality of messages during the normal operation of a device according to the invention.

Before a detailed description of FIGS. 1 to 4, the basic operation of a device which operates with alternating code signals will be explained with reference to FIGS. 5 and 6. A small portable key 1, for example in the form of a chip card or in the form of a customary key, includes a battery 2, a microprocessor 3 and a transmitter output stage 4 as well as a pushbutton key 5. The microprocessor includes a memory 6, in which, in addition to the programs necessary for operation, including an algorithm for calculating the respective following alternating code value, the respective alternating code value used last is also stored. In a corresponding way, a receiver 10 is provided with a receiver part 11 and a microprocessor 12. The microprocessor 12 includes a memory 13 in which programs, including the algorithm and the alternating code value used last, are stored. The receiver 10 is connected to a security device 14, for example a central locking system.

As a result of the pushbutton key 5 on the key 1 being actuated, the microprocessor 3 is started up and reads the previously used alternating code from the memory 6 in order to calculate from it, using the algorithm, the alternating code value included in the message to be transmitted. The message is then fed to the transmitter output stage 4 for transmission. After the message is received, there is checking in the microprocessor 12 of the receiver 10 to determine whether the alternating code value included in the message can be derived from the alternating code value stored there by application of the algorithm which is repeated to a limited degree. If it is derived from the alternating code value, the security device 14 is actuated so that, if appropriate, the doors are unlocked.

The block circuit diagram according to FIG. 1, is highly schematic and represents the parts necessary for understanding the invention. A plurality of commands can frequently be transmitted, received and carried out, a corresponding number of pushbutton keys then being provided—for example one for locking and one for unlocking. A message then comprises the respective command, the alternating code value and the time difference information, a checksum for detecting transmission faults also being provided in practice.

Figure 6:
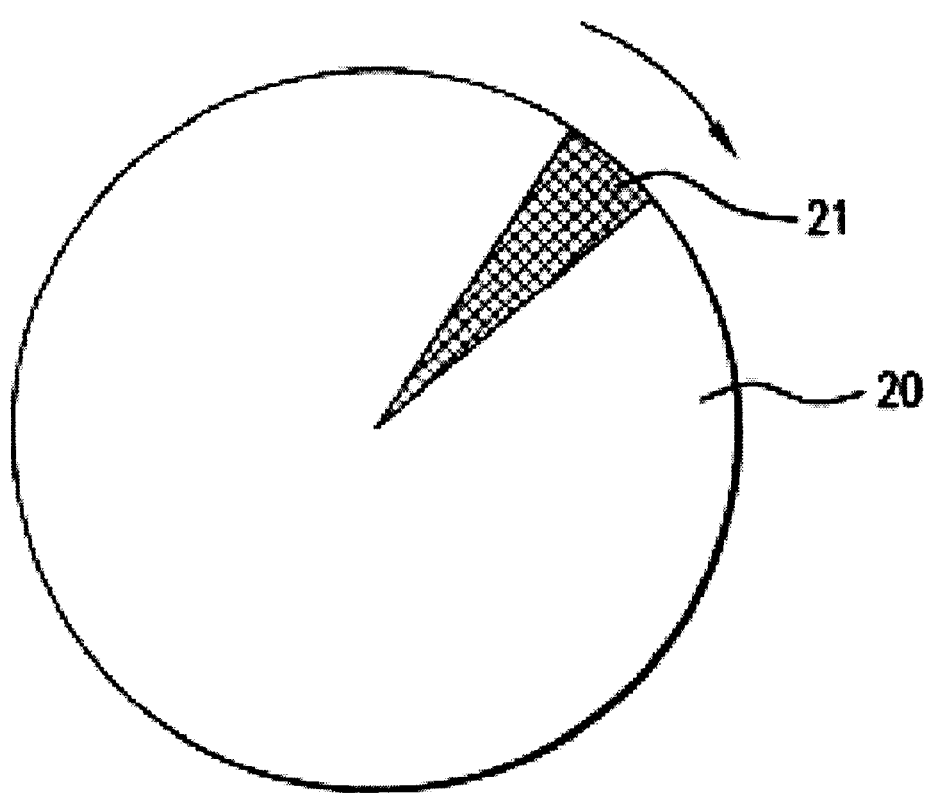
FIG. 6 shows a scheme explaining the alternating code method.

The set of possible alternating code values (code set) is illustrated in FIG. 6 in the form of a circle 20, it being possible to derive a segment 21 in each case by a single application, or application which is repeated to a limited degree, of the algorithm from the alternating code value used last. Whenever a valid alternating code value is received, the segment 21 is switched onward in the direction of the arrow, in which case alternating code values which have been used for a relatively long time before, can be reused after a very large number of actuations. In this way, the code set of the alternating code values can be used as frequently as desired. Nevertheless, protection against misuse is provided if the code set is large and the proportion of valid alternating code values is relatively small by comparison thereto.

In the device according to the invention, the microprocessors 3 and 12 each include a time measuring device which is started up, in the case of the transmitter, only by actuating the pushbutton key 5.

In FIGS. 1 to 4, an upwardly pointing arrow represents the transmission of a message, a downwardly pointing arrow represents the recording of a message, a jagged arrow represents a disruption of the receiver, a square standing on a point represents the normal reaction of the receiver to a received message (for example locking or unlocking of the motor vehicle), a vertical bar represents the start of the time measurement in the receiver, there being initially no further reaction to the received message, and an arrow pointing to the right represents the measurement of time in the transmitter or receiver, respectively. The individual diagrams are designated by T for transmitter, R for receiver, and I for recording or person making illegitimate intervention.

The normal operation which is illustrated in FIG. 1, is based on an initial condition in which the lag time has expired. In response to the first actuation during the time represented, a message T0 is transmitted, the time information of which merely indicates that the lag time since the last actuation has expired. In the example according to FIG. 1, two further actuations take place within the lag time, after the times t1 and t2 respectively, and finally a further actuation takes place after the lag time. The receiver reacts to the messages because they include valid time difference information.

Figure 2:
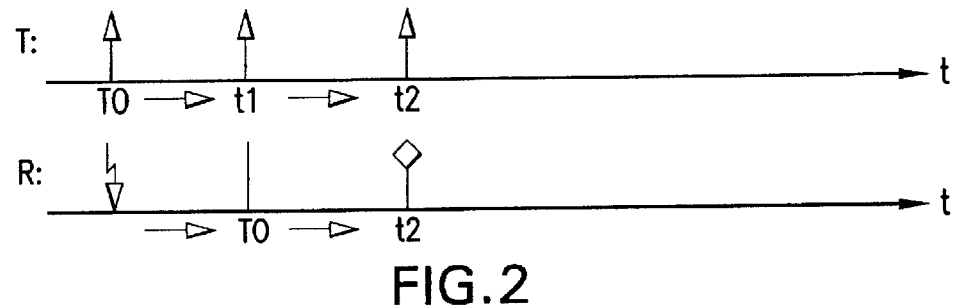
FIG. 2 shows messages when a random fault is present.

In the example illustrated in FIG. 2, the reception of the first message is disrupted. Time measurement does not begin in the receiver until the second transmitted message which is delayed by t1. If the message which is delayed by t2 is then received, the time measuring device in the receiver has also arrived at t2 so that this message is considered to be valid.

Figure 3:
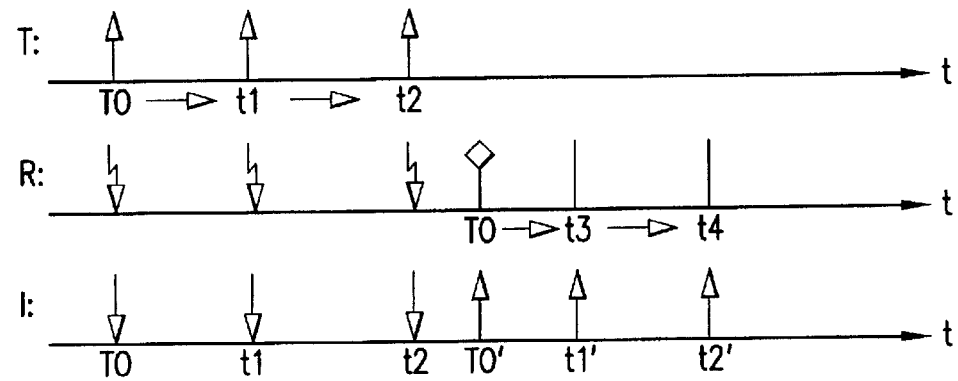
FIG. 3 shows messages when there is disruption by a person attempting illegal intervention, and the recording of the messages with immediate retransmission of the recorded messages.

FIG. 3 shows an example in which the expiry of the lag time is also in turn adopted as an initial condition. The transmitter then transmits a message T0. A recording device which is simultaneously provided with a jamming transmitter records this message. The second and third transmitted messages are then disrupted and recorded. If the retransmission of the three recorded messages—labelled in FIG. 3 as T0', t1'and t2'—occurs directly after the recording, the first reproduced message T0' includes the time difference information that the lag time has expired. This is also the case in the receiver. For this reason, the receiver reacts and causes the security device 14 (FIG. 1) to lock the doors, for example. This is desired from the point of view of a person attempting illegitimate intervention so that the legitimate user distances himself from the motor vehicle after he has observed that the doors are locked.

It is to be assumed that the reproduction of the following messages is not carried out with the same time differences, with the result that the time differences t1' and t2' which are conveyed with the respective messages do not correspond to the measured time differences t3 and t4 in the receiver, and the reception of these messages does not result in any reaction of the receiver.

Figure 4:
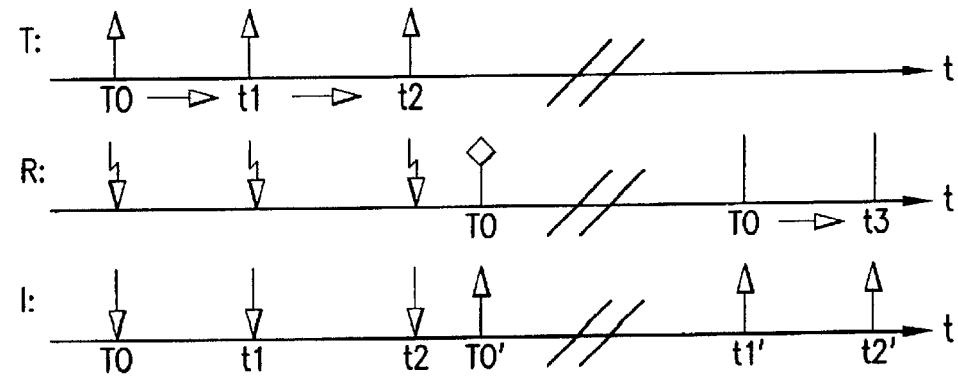
FIG. 4 shows messages with delayed transmission of the recorded messages.
Figure 5:
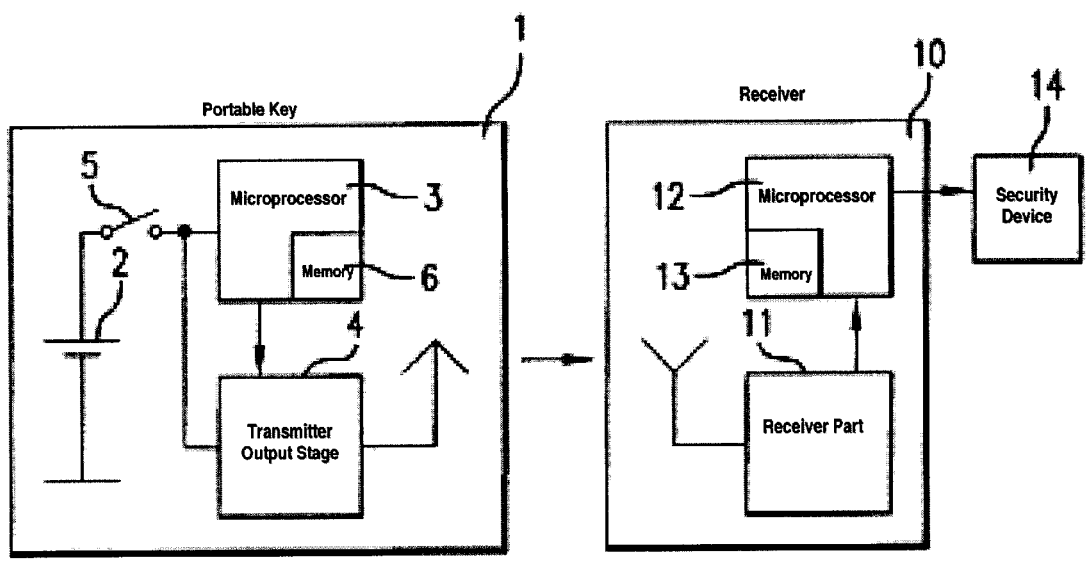
FIG. 5 shows a block circuit diagram of a device according to the invention.

FIG. 4 shows the case in which the first recorded message T0 is also transmitted directly after the recording, for the above-mentioned reasons, but the further messages are not transmitted until after the lag time has expired. In this case also, various values of the time difference information are again present within the messages and the measured time difference information so that the receiver does not react.

What is claimed is:

1. A device for controlling security in a motor vehicle, comprising:

a portable key having a transmitter for sending messages after actuation; and a security device including a receiver for receiving the messages, the messages including alternating code values which change from message to message, wherein a lag time of equal duration is implemented in the transmitter and receiver, the transmitter is switched off at the end of a duration of the lag time after a final actuation, when the transmitter, in a switched-on state, is actuated, the message is transmitted and includes time difference information, the time difference information indicating an elapsed time since a preceding message was transmitted, when the transmitter, in a switched-off state, is actuated, the transmitter is switched-on and transmits the message including the time difference information indicating an expiration of the lag time, and the security device is controlled if the time difference information included in the message corresponds to time difference information determined in the receiver.

2. The device as claimed in claim 1, wherein the messages include the alternating code values and the time difference information in encrypted form.

* * * * *